Aug. 30, 1927.
D. SIEBENMANN
1,640,967
BEAM SCALE
Filed March 9, 1927
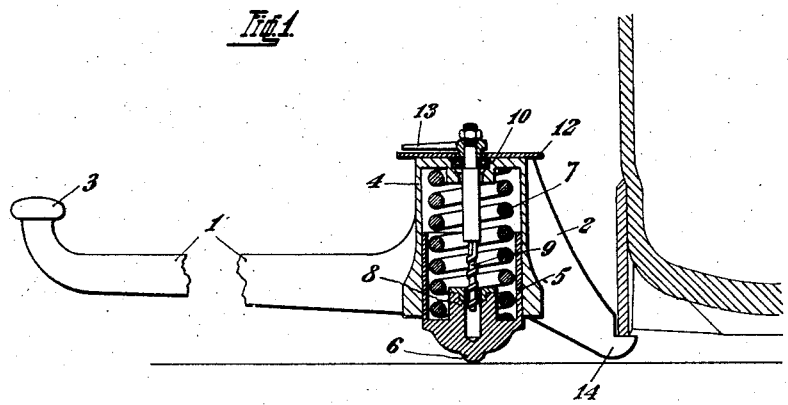
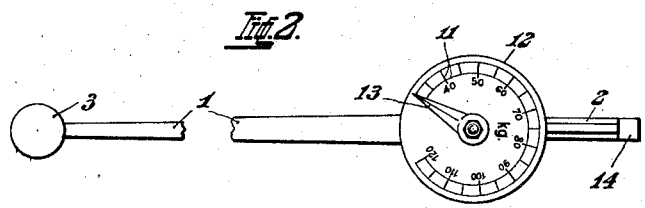
Daniel Siebenmann
INVENTOR Patented Aug. 30, 1927.

1,640,967

UNITED STATES PATENT OFFICE.

DANIEL SIEBENMANN, OF BERN, SWITZERLAND.

BEAM SCALE.

Application filed March 9, 1927, Serial No. 173,881, and in Switzerland March 10, 1926.

The present invention relates to a beam-scale having a lever with arms of different length whereof the shorter is adapted to grasp the load, while the lever is supported by a casing similar to a spring balance resting on a knife-edge the whole being so arranged that the load together with the lever is automatically weighed while being lifted-off from the ground.

A working example of the object of the invention is represented in the drawing.

Fig. 1 is a vertical section, and Fig. 2 a plan view.

According to the drawing the beam of the scale has two arms 1 and 2 of unequal length whereof the longer arm 1 is bent upwards and provided with a treadle 3. A cylindrical casing 4 open at the end and cast in one piece with the beam is fitted slidingly on a footing shaped like a hollow cylinder 5 open at the top, having a thickened bottom provided on its underside with a ridge 6 arranged transversely with regard to the beam and rounded-off as shown or sharp-edged like a knife. The two hollow cylinders 4 and 5 constitute a casing of a spring balance enclosing a strong helical spring 7 bearing on the two bottom walls of the two hollow cylinders. On a central boss at the end inside of the cylinder 5 a nut 8 is fixed carrying an upright quick-pitched screw spindle 9. The top end of this spindle is held by means of a ball bearing 10 in the end wall of the cylinder 4 and is extended to its outside where it carries a hand 13 movable on a graduated disk 12 fixed to said bottom wall. The tension of the helical spring is chosen so as to suit a certain minimum load. The short arm 12 of the beam is inclined downwards and provided with a shoulder 14 adapted to carry the intended load for instance a bottle for carbonic acid gas.

The beam-scale as shown has been especially built for weighing such gas bottles. For weighing the bottle is somewhat tilted and is put with its uplifted edge on the shoulder 14 of the scale which is resting on the knife edge 6. Then the bottle is inclined until its center of gravity stands over the said shoulder. By pressing down the treadle 3 the bottle will be lifted up and the cylinder 4 be pressed down so as to compress the spring 7. Hereby the screw spindle 9 will be caused to turn at an angle correspondingly with the load and the weight of the load, in this case that of the bottle, will be indicated by the hand 13 on the graduation 11.

What I claim as new is:

In a beam scale and in combination, two vertically arranged hollow cylinders open at their one ends and fitted slidingly one into the other so as to form a box, a lever integral with the end of the upper cylinder and provided at its downward directed shorter arm with a shoulder and at the end of its longer arm with a treadle, a quick-pitched central nut fixed to the inside of the bottom of the lower cylinder, a correspondingly pitched screw spindle fitted into said nut and lodged rotatably in the end of the upper cylinder and extended with its top end to the outside of the same, a helical spring supporting the upper cylinder inside of said box, a graduated dial fast to the end outside of the upper cylinder, a hand fixed to the top end of the screw spindle and adapted to serve as indicator on said dial and a knife-edge serving as pivoting means of the scale and integral with the end of the lower cylinder and arranged transversely with regard to said lever.

Signed at Bern, this 23d day of February, 1927.

DANIEL SIEBENMANN.